Sept. 8, 1936.  H. D. ELSE  2,053,425
ELECTRIC MOTOR
Filed Feb. 23, 1934   2 Sheets-Sheet 2

WITNESSES:  
E. A. McCloskey  
H. M. Riebel

INVENTOR  
Harry D. Else.  
BY  
W. R. Coley  
ATTORNEY

Sept. 8, 1936.  H. D. ELSE  2,053,425
ELECTRIC MOTOR
Filed Feb. 23, 1934  2 Sheets-Sheet 1
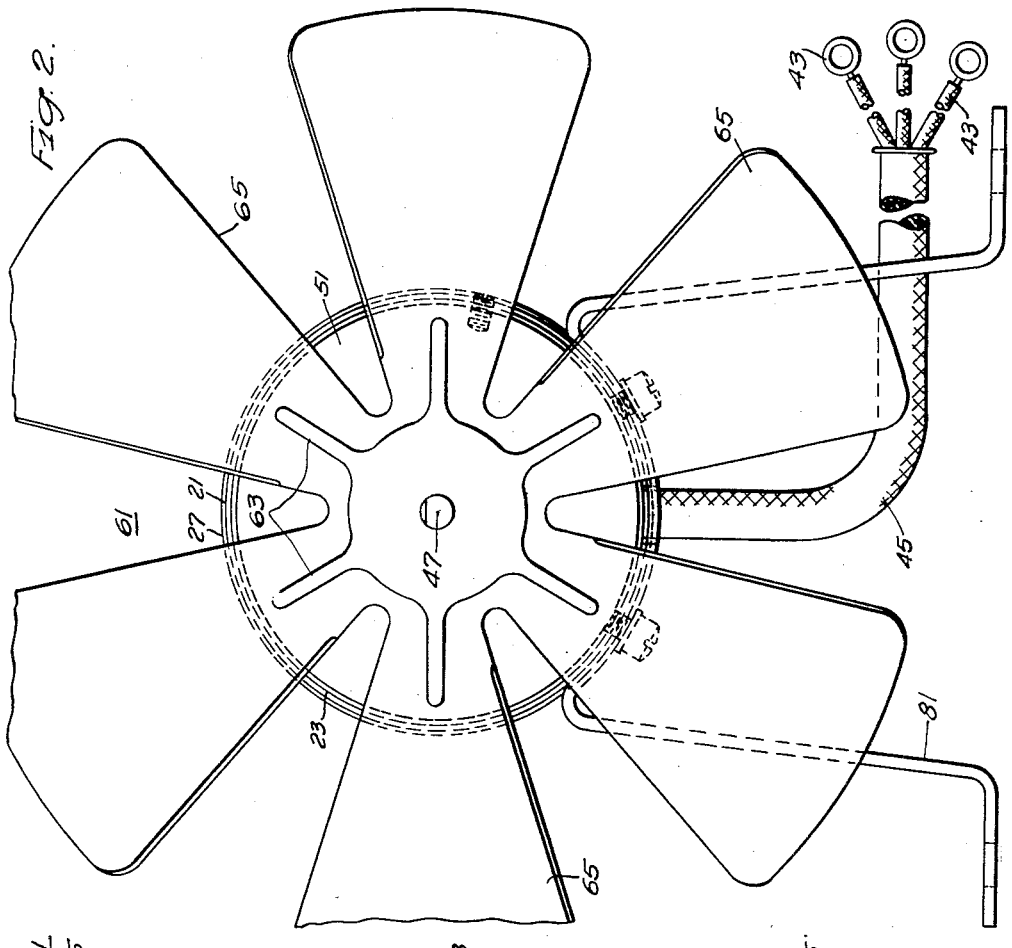
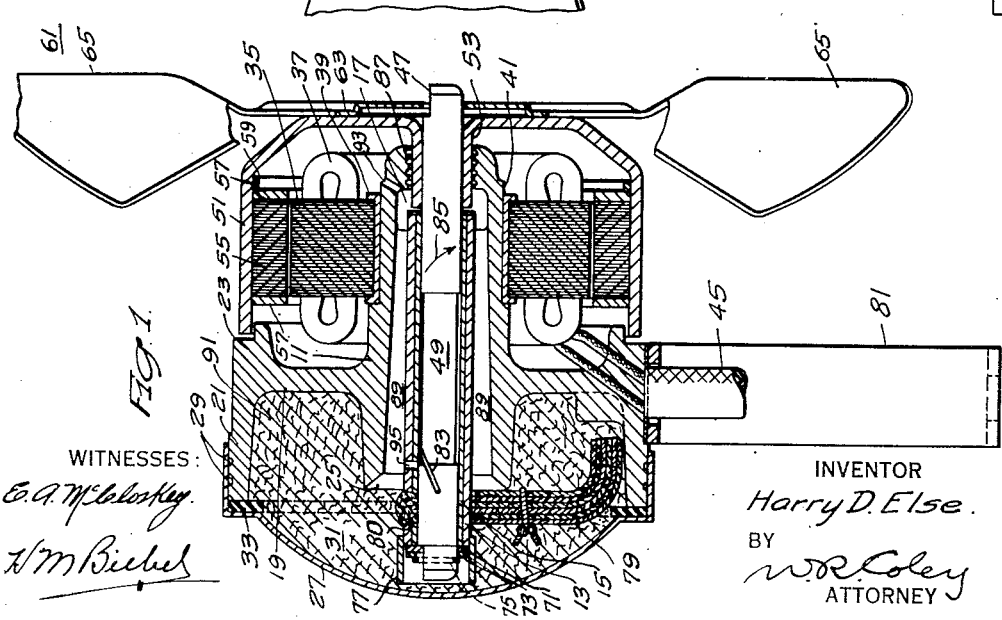
WITNESSES:
E. A. McCloskey
H. M. Biebel
INVENTOR
Harry D. Else.
BY
W. R. Coley
ATTORNEY Patented Sept. 8, 1936

2,053,425

UNITED STATES PATENT OFFICE 2,053,425

ELECTRIC MOTOR

Harry D. Else, Springfield, Mass., assignor to Westinghouse Electric & Manufacturing Company, East Pittsburgh, Pa., a corporation of Pennsylvania Application February 23, 1934, Serial No. 712,495
In Japan December 16, 1933

18 Claims. (Cl. 172—36)

My invention relates to electric motors and particularly to bearings, oiling means and an improved general assembly therefor.

An object of my invention is to provide a relatively simple assembly for an electric motor, and the like.

Another object of my invention is to provide a bearing and oiling means therefor that shall make refilling of the oil chamber unnecessary over very long periods of time.

Another object of my invention is to provide an improved oil circulating system for an electric motor.

Another object of my invention is to provide an oil storage chamber that shall be so constructed as to retain a relatively large amount of oil therein in any position of the motor.

In practicing one form of my invention I provide a stationary frame structure for an electric motor including a radial web having an oil chamber at one side thereof and having a stator structure fixedly mounted thereon at the other side of the radial web. A central hub provides, in effect, two bearings for a rotor shaft having a cup-shaped rotor housing located thereon, together with a motor structure therein and a fan blade assembly clamped against the central portion of the rotor housing. The central hub is provided with oil return openings therein, whereby oil pumped along the rotor shaft by means on the rotor shaft will be returned to the lateral oil retaining chamber.

In a modified form of device I provide a motor structure embodying a central hub, a radial web thereon having a portion supporting a stator structure, a bearing shell in the hub supporting a rotatable shaft, which has a rotor structure mounted thereon. A cap member cooperates with the radial web to provide an oil retaining chamber of relatively large capacity.

Figure 3:
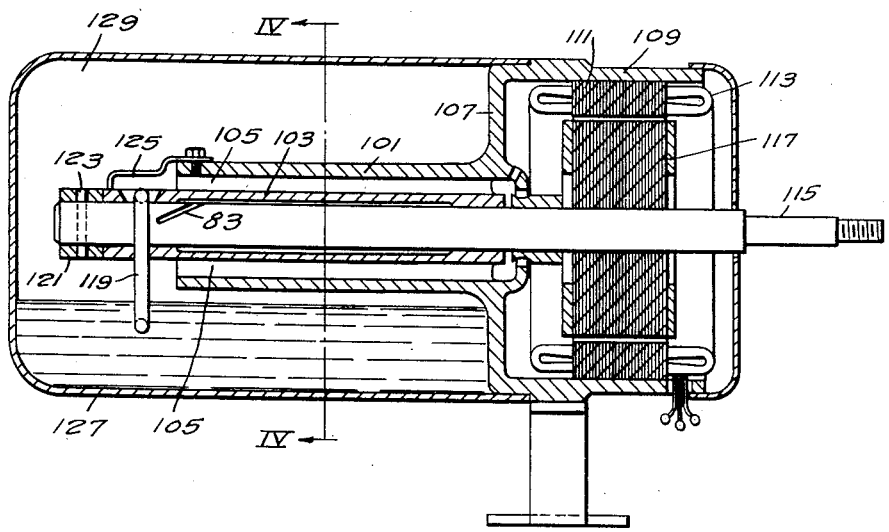
Figure 4:
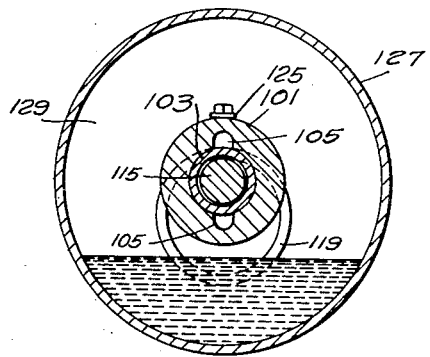

In the accompanying drawings,

Figure 1 is a view, in longitudinal section, of an improved motor driven fan assembly embodying my invention, Fig. 2 is a view in front elevation thereof, Fig. 3 is a view, in longitudinal section, of an electric motor embodying my invention, and Fig. 4 is a view in lateral section therethrough, taken on the line IV—IV of Fig. 3.

The motor structure embodying my invention and shown in Figs. 1 and 2 includes a central hub 11 which is relatively long axially and which has an opening therein for receiving a stationary bearing shell 13 within which there may be located a bearing sleeve 15 made of a suitable metal, such as bronze. While I have shown two separate bearing members, I do not desire to be limited thereto, as the bronze sleeve may be welded to the shell or the bearing may be made of a single thickness of any suitable bearing metal. The bearing may consist of a single relatively long bearing but I prefer to divide the bearing by relieving the mid portion of either the shaft or the bearing shell. It may be noted that the shell and the sleeve extend beyond one end of the central hub while the other ends of the shell and the sleeve are located within the hub and particularly within an oil-catching or oil-receiving chamber 17 which may be of substantially annular shape.

The frame portion which includes the central hub 11 also includes a radial web 19 which may be integral with the central hub and be located intermediate the ends thereof. The web is provided with a peripheral axially extending flange 21 and a second flange 23, the two flanges being located at opposite sides of the outer rim portion of the central web 19. That portion of the central hub located on the same side of the central web 19 as is the flange 21, and which is designated by numeral 25, is relatively long axially to provide, in combination with other elements to be hereinafter described an oil-containing or oil-storing chamber of relatively large capacity. A cover member 27, preferably but not necessarily of metal may be of cup-shape and have a resilient rim, so that it can be forced over the outer edge of flange 21 which, as shown more particularly in Fig. 1 of the drawings, may be provided with one or more peripheral grooves 29 to receive a sealing cement to prevent leakage of oil between the flange 21 and the cover 27. A further means for insuring that oil placed in the chamber 31 will be retained therein may be constituted by an annular washer or gasket 33 located at the axial end of flange 21 and between it and the cover 27. I do not desire to be limited to the exact sealing means shown, as I may employ other constructions effective for the same purpose.

A stationary stator structure includes a set of stator laminations 35 and a suitable energizing winding 37 therefor, the laminations being located on a hub or core 39 in order that it may be easily and quickly pressed on a seat 41 provided therefor on the central hub at that side or end thereof where flange 23 is located. I do not desire to be limited to any particular kind of energizing winding, and it, therefore, is to be understood that energizing winding 37 may include a main and an auxiliary winding, the energization of which is effected through the plurality of leads 43, shown more particularly in Fig. 2 of the drawings, which may be enclosed in a flexible conduit 45.

A rotor shaft 47 is provided with an intermediate portion 49 of reduced diameter in order to make possible a better machining and assembly job. A cup-shaped rotor housing 51 may have a re-entrant flange portion 53 integral therewith pressed on and over the shaft 47 and located thereon in proper operative position. A rotor structure may include a set of rotor laminations 55, together with squirrel cage rotor bars, not shown particularly in the drawings, as well as end rings 57 in a manner well known in the art. A narrow balancing ring 59 may be located at one edge of the rotor structure and comprises an annulus either less than or more than a complete circle, which annulus is shifted peripherally to effect proper balancing of the rotor.

A fan blade structure 61 includes a central hub portion having raised portions 63 therein and a plurality of fan blades 65. The fan blade structure 61 is held in proper operative position against one end of the member 51 in any desired manner, one method being to spot weld the two structures together. However, the structure 61 may be secured on the shaft by any other means well known in the art.

As it is desired to cause air moved by the fan blade assembly 61 to move from right to left of the device as seen in Fig. 1 of the drawings, I provide means at the left-hand end of the shaft to take care of the unbalanced pull on shaft 47. This means includes a wearing plate 71, a second plate or washer 73 and a spring ring 75 located in a groove in shaft 47, and it is obvious that the work done by the fan blade assembly will cause the shaft 47 to move slightly to the right so that there will be frictional engagement between the wearing plate 71 and the axial ends of members 13 and 15 as long as the motor is energized and operating. I provide a protecting ring 77 around the end of the shaft in order to protect the strands of an oil wick 79.

In its normal operating position the motor will be in substantially the position shown in the drawings and supported by a relatively simple supporting bracket 81 so that the oil in chamber 31 will be in the lower portion thereof. I provide an opening 80 through the upper part of the members 13 and 15 within which the wick 79 may fit so that oil raised by the wicking from the bottom of the oil chamber will be conducted to the rotating shaft 47.

Means for forcing this oil along the shaft 47 from the rear end to the front end thereof comprises a slot or groove 83 extending angularly with reference to the axis of the shaft 47 and in such direction that when the shaft rotates in the direction of the arrow 85 oil will be forced from the left-hand end of the shaft to the right-hand end thereof. It will be noted that the slot or groove 83 is cut not only into the rear portion of the shaft 47 which is of full diameter, but extends also into the part 49 of reduced diameter.

The correlation of the angularly inclined groove 83 on the shaft 47 and the rotation thereof is such as to force the oil to the right-hand end of bearing sleeve 15 from which it will either flow into the oil-receiving or oil-catching chamber 17, or it will be thrown into the chamber 17 by the centrifugal action of the inner edge of the hub portion 53 of the cup-shaped rotor housing. In order to aid in preventing oil moving axially toward the fan assembly I may provide a plurality of individual grooves or a helical groove 87 within the right-hand end of central hub 11 as is shown more particularly in Fig. 1 of the drawings.

In order to provide a return means for the oil collected in chamber 17 I may provide a plurality of axially extending oil return openings 89 in the central hub. These oil return holes are made to incline slightly from chamber 17 to the oil chamber 31 so as to facilitate return flow of the oil. In order to insure that the oil in chamber 31 shall not be permitted to be unduly agitated as in the handling of the motor during assembly and during installation thereof, I may fill oil chamber 31 with packed waste 91. A breather hole 93 is provided in the central hub 11 from the oil-catching chamber 17 to relieve any excess pressure that might otherwise occur in the oil storage chamber 31 on increase of temperature of the surrounding parts and of the oil and the packing therein.

An opening 95 is provided through the bearing shell to prevent syphoning out of the oil in chamber 31 if the motor is stood on end, with the oil chamber 31 uppermost, for any considerable length of time.

Referring now to Figs. 3 and 4 I have there illustrated a modified form of motor assembly embodying my invention. A stationary structure includes a central hub 101, having a bearing sleeve 103 therein and traversed axially thereof by a plurality of oil-return holes 105 which are slightly angularly inclined relatively to the axis of the hub. A radial web 107 may be made integral with the hub and have an axially extending flange portion 109. A stator structure including a set of stator laminations 111 and a stator winding 113 are supported by the flange 109.

A rotor structure includes a rotor shaft 115, and a rotor 117 thereon and the rotor may be of any kind known in the art. The bearing shell may extend beyond the hub 101 and have an opening in its normally upper surface to which oil may be brought by an oil ring 119. A thrust washer 121 may be held on the end of shaft 115 as by a pin 123 extending through it and the shaft. An oil ring retaining means may comprise a clip 125 secured to the hub 101, to ensure that the oil ring will be returned to its proper operative position after the motor assembly has been tilted out of its normal position.

A relatively deep cap member 127 is suitably secured in oil-tight relation on flange 109, the cap and the radial web cooperating to provide an oil storage chamber 129 of relatively large capacity.

It is obvious that if the motor structure shown in Figs. 1 and 2 is turned on end with the cap 27 uppermost, the oil-holding capacity of the chamber 31 is limited by the height of the extension 25 of the central hub above the radial web 19. By making this extension of the proper length it will be possible to retain substantially all of the oil initially contained by the chamber therein, even though the motor be momentarily stood on end with the cap or cover 27 uppermost.

The same comments hold true with regard to the motor assembly shown in Figs. 3 and 4, where the oil-retaining capacity in an up-ended position is limited by the height of the central hub above the radial web 107.

Extended tests on motors of this kind have indicated that the design and construction disclosed in the drawings and hereinbefore described provide a motor of relatively simple and inexpensive construction embodying particularly an oil-storage chamber of relatively large capacity which makes it unnecessary to add oil to the motor at frequent intervals. From indications thus far obtained, as to the rate of use of oil, it is apparent that the amount originally placed in the oil chamber 31 will be sufficient for the life of the motor itself.

The device embodying my invention thus provides not only an oil storage chamber of relatively large capacity but also provides means embodied in the mechanical elements shown and described whereby accidental leakage of any part of the oil is effectively prevented irrespective of the position to which the motor may be turned, be that position a normal one or an abnormal one. The device embodying my invention provides further a relatively simple and highly efficient oil returning means which has been found to operate properly in extended tests.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In a motor, a frame structure including a solid radial web, an axially-extending flange engaging the web at its outer periphery, said flange having a diameter approximately equal to that of the remainder of said frame structure, a central hub having a portion extending a relatively long distance axially at one side of the radial web and secured thereto and also extending on the other side thereof, and a cover member engaging one axial edge of the axially-extending flange whereby the radial web, the axially-extending flange, a portion of the central hub and the cover cooperate to constitute an oil storage chamber effective to retain oil therein in any position of the motor.

2. In an electric motor, a frame structure including a radial web, a flange secured to the outer periphery of the radial web and extending axially to one side thereof, a central bearing hub extending axially to one side of the radial web substantially coextensive with the flange, said web and hub being disposed within the bounds of the motor as otherwise constituted, and a cover engaging the free axial edge of the flange, the web, flange, bearing hub and cover enclosing an oil storage chamber effective to retain a large amount of oil therein in any position of the motor.

3. In an electric motor adapted to operate with a horizontal shaft axis, a central bearing hub, a bearing sleeve in the hub terminating short of one end of the hub, a shaft rotatable in the bearing sleeve, an oil storage chamber at the other end of the hub, an oil-holding chamber in the bearing hub at the inside end of the bearing sleeve, means effective by the rotation of the shaft to force oil from the oil chamber along the shaft to the oil-holding chamber and a passageway in the hub inclined angularly downwardly toward the oil storage chamber to return oil collecting in the oil holding chamber to the oil storage chamber.

4. In an electric motor, a central bearing hub, a bearing sleeve in the hub terminating short of one end of the bearing hub, a rotor shaft rotatably mounted in the bearing sleeve, means constituting an oil reservoir at the other end of the bearing hub, means on the shaft and operable by rotation thereof adapted to force oil from the reservoir along the shaft, an oil-holding chamber in the bearing hub at the concealed end of the bearing sleeve to catch oil forced along the shaft, a rotor housing hub on the shaft and extending into the bearing hub adjacent to the concealed end of the bearing sleeve, and means in the bearing hub cooperating with the rotor housing hub to prevent oil moving out of the oil-holding chamber and along the rotor housing hub.

5. In a motor comprising a rotor and a stator, a bearing hub extending axially away from the stator and rotor, a bearing sleeve in the hub having one end extending therebeyond, a radial web secured to the hub at one side of the stator and rotor, a dished cover having an air tight connection with the radial web to form an oil storage chamber, a rotatable shaft in the bearing sleeve, means outside of the bearing hub and within the exposed end of the bearing sleeve to deliver oil to the shaft, means to cause oil to move along the shaft away from the oil storage chamber and means in the hub to return the oil moved along the shaft to the oil storage chamber.

6. In a motor comprising a rotor and a stator, a bearing hub extending axially away from the stator and rotor, a bearing sleeve in the hub having that end thereof nearer the stator and rotor within the hub and that end further away from the stator and rotor extending beyond the hub, a radial web on the hub at one side of the stator and rotor, a dished cover having a airtight connection with the radial web and covering the exposed end of the bearing sleeve, to form an oil storage chamber, a rotatable shaft in the bearing sleeve, means in the oil storage chamber and outside of the hub to deliver oil to the shaft, means on the shaft to cause oil to move along the shaft away from the oil storage chamber, and an oil return hole in the hub to return oil moved along the shaft to the oil storage chamber.

7. In a motor, a frame structure, bearing means provided in the frame structure, a drive shaft supported by the bearing and extending outwardly of one end of the frame structure, a motor stator mounted on the frame structure, a motor rotor operatively connected to the outwardly extending portion of the drive shaft for driving the same, sealing means cooperating with the frame structure for providing a lubricant reservoir at the opposite end of the drive shaft, and means for preventing the escape of lubricant from the end of the shaft to which the motor rotor is connected.

8. In a motor, a frame structure, bearing means provided in the frame structure, a drive shaft supported by the bearing, a motor stator mounted on the frame structure, a motor rotor mounted externally of the motor stator, and operatively connected adjacent one end of the drive shaft for driving the same, means cooperating with the frame structure to form a sealed lubricant reservoir at the opposite end of the drive shaft, means for preventing the escape of lubricant from the end of the shaft to which the motor rotor is connected, and an inclined passageway in the frame structure to return oil from that end of the shaft to which the motor rotor is connected to the lubricant reservoir.

9. In a motor for driving a device, a frame structure, bearing means provided in the frame structure, a drive shaft supported by the bearing means, a motor stator mounted on the frame structure, a motor rotor operatively connected adjacent one end of the drive shaft for driving the same, said drive shaft overhanging the frame structure at the rotor end for driving the device, means forming with the frame structure a sealed lubricant reservoir at the opposite end of the drive shaft, and means for preventing escape of lubricant from the overhanging end of the drive shaft.

10. In a motor, a stationary frame structure embodying an extended bearing structure, a drive shaft disposed in the bearing structure and having first and second end portions, said first end portion projecting beyond the bearing structure, a stator surrounding a portion of the frame structure and secured to the latter, a rotor surrounding the stator, means for securing the rotor to the projecting portion of the drive shaft, and means cooperating with the frame structure to enclose the second end portion of the drive shaft and to form a reservoir for supplying lubricant to the bearing.

11. In an electric motor adapted to operate on a horizontal shaft axis, a bearing hub, a bearing sleeve in the hub, a rotor shaft rotatable in the bearing sleeve, an oil chamber at one end of the hub and the bearing sleeve, means on the shaft to force oil along the shaft away from the oil chamber during rotation of the shaft, a passageway on the bearing hub angularly inclined relatively to the axis of the rotor shaft to return oil forced through the bearing sleeve to the oil chamber and anti-oil-syphoning means in the bearing hub and sleeve adjacent to the oil chamber.

12. In an electric motor adapted to operate on a horizontal shaft axis, a bearing hub, a bearing sleeve on the hub, a rotor shaft rotatable on the bearing sleeve, an oil chamber at one end of the hub and the bearing sleeve, means on the shaft to force oil along the shaft away from the oil chamber during rotation of the shaft, a plurality of passageways in the bearing hub inclined angularly relatively to the axis of the rotor shaft to return oil forced through the bearing sleeve to the oil chamber and an opening from one of said passageways through the bearing hub and sleeve to prevent oil being syphoned out of the oil chamber in case the rotor axis is held substantially vertical.

13. In an electric motor, a bearing hub, a radial web thereon intermediate its ends, an axially-extending flange at one side of the web, a cap engaging the outer end of the axially-extending flange whereby the radial web, a portion of the bearing hub, the axial flange and the cover cooperate to constitute an oil storage chamber effective to retain a large amount of oil therein in any position of the motor, a bearing sleeve in the hub terminating short of that end of the hub on the other side of the web from the axial flange, a stator structure fixedly mounted on the hub at the other side of the web, a rotor shaft rotatable in the bearing sleeve, a rotor housing of dished shape mounted on the rotor shaft and a rotor structure in the housing in cooperative position relatively to the stator structure and cooperating with the radial web to substantially entirely enclose the stator structure.

14. In an electric motor comprising a bearing hub, a bearing sleeve in the hub, a rotor shaft rotatable in the bearing sleeve and subject to axial thrust, an oil storage chamber at one end of the rotor shaft, a thrust plate on the rotor shaft at that end thereof located in the oil storage chamber engaging the adjacent end of the bearing sleeve and a spring ring on the motor shaft adjacent to the thrust plate to hold the same on the shaft.

15. In an electric motor comprising a bearing hub, a bearing sleeve in the hub, a rotor shaft rotatable in the bearing sleeve and subject to axial thrust, an oil storage chamber at one end of the rotor shaft, oil-absorbing material therein, a thrust plate on the rotor shaft at that end thereof located in the oil storage chamber engaging the adjacent end of the bearing sleeve, a spring ring on the motor shaft adjacent to the thrust plate to hold the same on the shaft, and a member operatively supported by the bearing sleeve for protecting said oil-absorbing material.

16. In an electric motor, an elongated bearing hub, a radial web thereon intermediate its ends, a bearing sleeve in the hub terminating short of one end of the hub, a stator structure fixedly mounted on the hub at the same end, a dished rotor housing having a central re-entrant flange portion extending into the hub at the same end thereof and the outer peripheral portion extending close to the radial web to enclose and protect the stator structure.

17. A device as set forth in claim 1 and including means in the central hub to relieve excess pressure in the oil storage chamber.

18. A device as set forth in claim 6 and including an opening through the hub from the oil return hole, said opening being located at the end of the hub away from the oil storage chamber.

HARRY D. ELSE.

DISCLAIMER 2,053,425.—*Harry D. Else*, Springfield, Mass. ELECTRIC MOTOR. Patent dated September 8, 1936. Disclaimer filed July 16, 1940, by the assignee, *Westinghouse Electric & Manufacturing Company*.

Hereby enters this disclaimer to claims 7 and 9 in said specification.

[*Official Gazette August 6, 1940.*]